May 26, 1959  R. K. McGEARY ET AL  2,888,343
ALLOYS AND MEMBERS PRODUCED THEREFROM
Filed Oct. 11, 1955
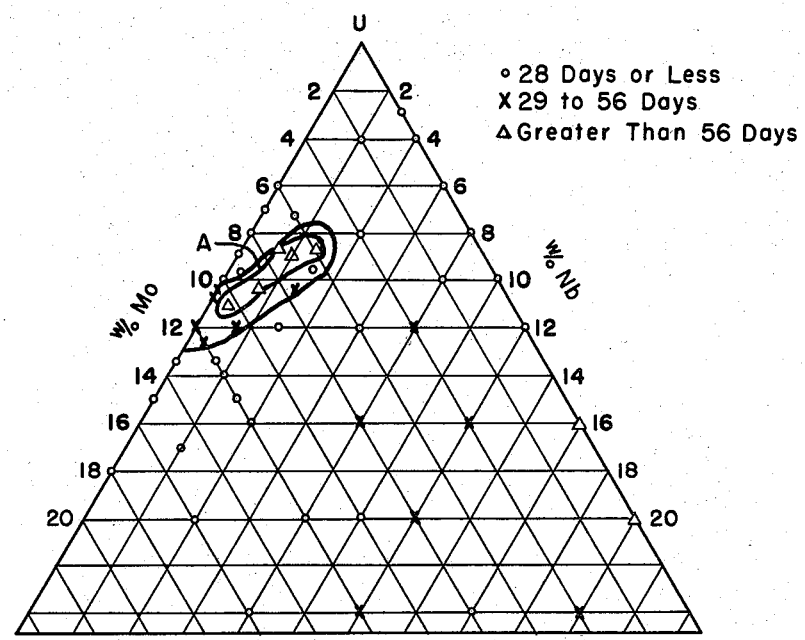
Time for Discontinuos Corrosion Failure in 650° F.
Water for Gamma Quenched U-Mo-Nb Alloys.
INVENTORS
Robert K. McGeary and
Robert D. Leggett.
BY
ATTORNEY

United States Patent Office 2,888,343
Patented May 26, 1959

2,888,343

ALLOYS AND MEMBERS PRODUCED THEREFROM

Robert K. McGeary and Robert D. Leggett, Pittsburgh, Pa., assignors to Westinghouse Electric Corporation, East Pittsburgh, Pa., a corporation of Pennsylvania Application October 11, 1955, Serial No. 539,784

4 Claims. (Cl. 75—122.7)

This invention relates to ternary alloys of molybdenum, niobium, and uranium, and members prepared therefrom, particularly suitable for use as fuel elements in nuclear reactors.

Fuel elements for nuclear reactors must possess good corrosion resistance under the conditions to which they will be subjected. One extensively employed type of nuclear reactor employs water in contact with the fuel elements. The water may be at a substantial temperature of up to 650° F. or even higher. Under these conditions, uranium metal corrodes extremely rapidly, often failing in a day or less and, consequently, cannot be used satisfactorily. While protective cladding may be applied to the uranium fuel elements in order to reduce the corrosion, the cladding is not necessarily perfect when applied, since there may be microscopic cracks or flaws therethrough. Furthermore, during operation of the reactor, due to thermal strains and changes induced by radiation, the cladding may rupture or open up. In any event, the high temperature water will penetrate through the cracks, fissures, or other flaws in the cladding and will cause rapid corrosive failure of the uranium which may result in damage to the reactor due to the close clearances between the fuel elements and the control rods and the like.

The object of this invention is to provide a high corrosion resistant alloy composed of from 2% to 15% by weight of molybdenum, from 0.2% to 10% by weight of niobium, and the balance being uranium, either natural or enriched, the alloy being in the gamma phase.

A further object of the invention is to provide a member suitable for use as a fuel element in a nuclear reactor comprising an alloy composed of from 2% to 15% by weight of molybdenum, from 0.2% to 10% by weight of niobium, and the balance being uranium, either natural or enriched, the alloy being in the gamma phase.

For a better understanding of the nature and objects of the invention, reference should be made to the following description and drawing, in which the single figure is a portion of a ternary diagram of alloys comprising uranium, molybdenum, and niobium.

We have discovered ternary alloys of molybdenum, niobium, and uranium which alloys, while in the gamma phase, have an extremely high corrosion resistance when exposed to water at a temperature of as high as 650° F. These alloys are suitable for use as fuel elements for nuclear reactors, with or without a protective cladding. Briefly, the ternary alloys of the present invention are composed of from 2% to 15% by weight of molybdenum, from 0.2% to 10% by weight of niobium, and the balance being uranium, either natural or enriched uranium. The alloy is formed into members, as will be set forth hereinafter, and when the members are homogenized by heating in the gamma field, usually about 900° C. and higher, and quickly cooled or quenched therefrom to room temperature, they retain the gamma phase. The members exhibit high corrosion resistance to water and steam at elevated temperatures. Exceptionally high corrosion resistance has been obtained from the more limited range of compositions comprising from 5% to 13% by weight of molybdenum, and from 0.2% to 4% by weight of niobium, and the balance being the uranium.

The ternary alloy may be prepared conveniently by introducing the required amounts of uranium, molybdenum, and niobium into an induction furnace comprising a graphite crucible lined with zirconia, and melting them in vacuum, or under a suitable protective atmosphere, such as argon or helium. The molten alloy is then cast in a graphite mold into an ingot or, if desired, it may be cast directly in a refractory mold such as used for precision casting into a desired form of member. The ingots may be chill cast. The castings or members are homogenized by heat-treating at about 900° C. for a period of time of hours, for instance, from 12 to 24 hours. The homogenized alloy may be then quenched by immersion in oil or water or by air cooling to room temperature in one or two hours. The resulting members will have the gamma phase. In producing rods and strips for fuel element purposes, the ingots of the alloy may be extruded or forged. In some cases, the alloy may be disposed within an envelope of a protective cladding material, such as the zirconium alloy set forth in detail in copending application Serial No. 416,396, filed March 15, 1954, and issued December 4, 1956, and now U.S. Patent No. 2,772,964, assigned to the assignee of the present invention. In tests that we have conducted, the cladding was removed from some of the extrusions in order to test the corrosion resistance of the ternary alloy alone.

The ternary alloy ingot may be arc melted, using the ingot as a consumable electrode in order to produce an ingot of more uniform composition throughout and to produce larger diameter members. Such arc melting procedure is disclosed in copending application Serial No. 367,524, filed July 13, 1953, assigned to the assignee of the present invention.

The alloy members must have substantially no alpha phase, otherwise the corrosion may be excessive and the other properties will be less satisfactory.

*Example I*

An induction melt was made of an alloy comprising 7% by weight of molybdenum, 2% niobium, and the balance being natural uranium. The ingot was heated to 1950° F. in a salt bath and was forged into a flat sheet from which specimens of a thickness of one-quarter inch and of a surface area of approximately 5 square centimeters were prepared. The specimens were heated for one day at 900° C. and then quenched rapidly in order to maintain the gamma phase throughout the specimen. The specimens were annealed by heating them for 7 days at 400° C. in a helium gas atmosphere and were thereafter placed within a sealed autoclave in which water at 650° F. was present. In this test, all of the specimens lasted from 154 to 168 days before failing by corrosion.

By contrast, an alloy composed of 7% molybdenum and 93% uranium, prepared in a manner similar to the ternary alloy of this example, failed in less than one day in the 650° F. water, the 7% molybdenum-uranium alloy specimens completely disintegrating in less than 24 hours in this test.

*Example II*

A casting was prepared from an induction melt comprising 12% molybdenum, 0.5% niobium, and the balance natural uranium. After being homogenized at 900° C. for 24 hours, specimens produced by extruding the alloy were water quenched to produce the gamma phase throughout. The specimens were then annealed for 7 days at 400° C. The specimens when placed in 650° F. water lasted for from 140 to 154 days before failing.

Reference should be made to the single figure of the drawing wherein there is shown a portion of a ternary diagram for uranium-niobium-molybdenum alloys adjacent the 100% uranium point. The points plotted on the chart represent various alloy batches prepared and tested in the manner set forth in the preceding examples. The diagram covers alloys composed of 76% and higher uranium, up to 20% molybdenum and up to 20% of niobium. It will be noted that the ternary alloys comprising between 5% and 13% molybdenum, from 0.2% to 4% niobium, and the balance being uranium have outstanding corrosion resistance, as compared to other alloy compositions. The area within inner curve A includes compositions with outstanding corrosion resistance to high temperature water. Alloys of equal corrosion resistance are not obtainable with molybdenum alone. Binary alloys of niobium and uranium must contain from 16% to 20% of niobium to give similar corrosion resistance. However, the presence of such large amounts of niobium is not generally desirable in a fuel element.

We have secured the maximum corrosion resistance from members comprising the gamma quenched alloy of from 9% molybdenum and 1.4% niobium. Members of this alloy exhibited a shiny black glossy surface. When placed in water at 650° C., members of this specific alloy had a uniform corrosion rate of about 0.08 milligram per square centimeter per hour over a period of some 168 days.

Members may be prepared according to the above examples by substituting enriched uranium for the natural uranium. Thus, uranium comprising 90% of $U_{238}$ and 10% of $U_{235}$ may be substituted for the natural uranium of Examples I and II with similar corrosion results. The term "uranium" as employed in the claims includes any isotope or mixtures of isotopes of uranium.

Specimens of the alloys of this invention were tested by irradiation and found to have little anisotropic changes. They had less undesirable growth and other changes as compared to uranium alone.

It will be understood that the above drawing and description are only exemplary.

We claim as our invention:

1. A member suitable for use as a fuel element for a nuclear reactor comprising an alloy composed of from 2% to 15% by weight of molybdenum, from 0.2% to 10% by weight of niobium, and the balance being uranium, said alloy being in the gamma phase.

2. An alloy suitable for use as a fuel element for a nuclear reactor composed of from 5% to 13% by weight of molybdenum, from 0.2% to 4% by weight of niobium, and the balance being uranium, the alloy being in the gamma phase.

3. A member suitable for use as a fuel element for a nuclear reactor comprising a wrought alloy composed of from 5% to 13% by weight of molybdenum, from 0.2% to 4% by weight of niobium, and the balance being uranium, the alloy being in the gamma phase.

4. An alloy composed of from 2% to 15% by weight of molybdenum, from 0.2% to 10% by weight of niobium, and the balance being uranium.

References Cited in the file of this patent

Saller et al.: "Compilation of U.S. and U.K. Uranium and Thorium Constitutional Diagrams," publ. June 1, 1955, by U.S.A.E.C. as BMI–1000. Entire publication 141 pages; pages 44–45, 48–49 relied upon. Available from O.T.S., Dept. of Commerce, Washington 25, D.C., @ 90¢.